United States Patent [19]

Abouchar et al.

[11] 4,440,021
[45] Apr. 3, 1984

[54] MASS FLOW METER WITH REDUCED ATTITUDE SENSITIVITY

[76] Inventors: John W. Abouchar, 18881 Patrician Dr., Villa Park, Calif. 92667; Michael J. Doyle, 2705 Calle Loma Roja, Riverside, Calif. 92805

[21] Appl. No.: 173,282

[22] Filed: Jul. 29, 1980

[51] Int. Cl.³ .............................................. G01F 1/68
[52] U.S. Cl. ........................................................ 73/204
[58] Field of Search ........................................... 73/204

[56] References Cited

U.S. PATENT DOCUMENTS 3,938,384 2/1976 Blair ...................................... 73/204

Primary Examiner—Herbert Goldstein
Attorney, Agent, or Firm—G. Donald Weber, Jr.

[57] ABSTRACT

There is shown and described a mass flow measuring system for measuring the flow rate of a fluid in a sensing tube over a wide ambient temperature range and with low sensitivity to attitude change. The improvement is directed to the insulating material which is used with the system and the means for producing an isothermal plane around the system.

12 Claims, 6 Drawing Figures

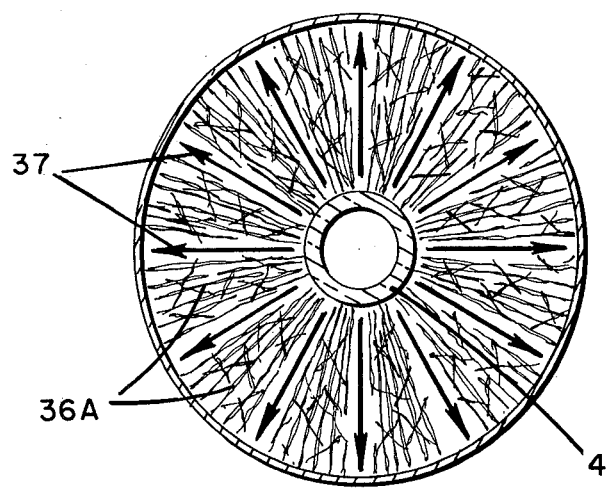
FIG. 4
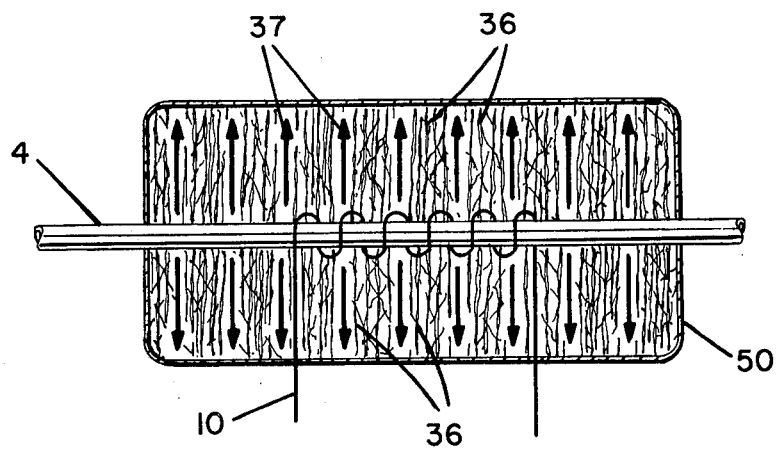
FIG. 5
FIG. 6
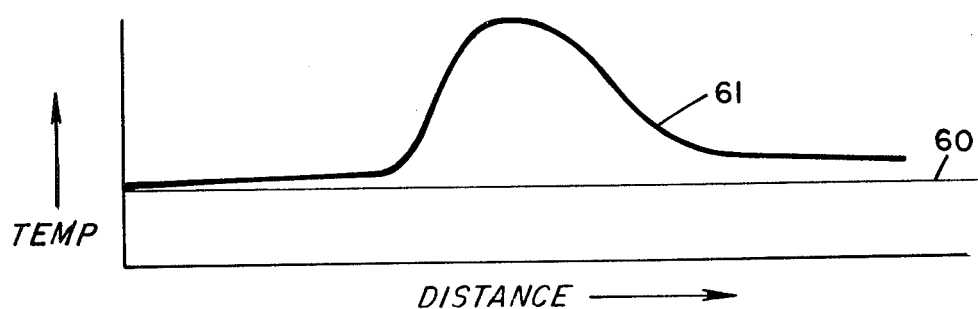

MASS FLOW METER WITH REDUCED ATTITUDE SENSITIVITY

BACKGROUND

1. Field of the Invention. This invention is directed to mass flow measuring systems, in general, and to a system wherein a vastly improved operation is achieved with a novel insulator material and construction.

2. Prior Art. In conventional mass flow measuring systems, heat is applied to (1) a sensing tube which is used to conduct a fluid to be measured or (2) directly to a fluid. The temperature of the fluid is measured before and after the heat is applied. When the upstream temperature is equal to the unheated stream temperature, mass flow can be measured as inversely proportional to the temperature difference for a constant heat addition by means of a conventional bridge circuit. Reference is herewith made to U.S. Pat. No. 3,938,384 Mass Flow Meter with Reduced Attitude Sensitivity. R. F. Blair, assigned to Tylan Corporation. The cited patent provides a suitable detailed description of conventional mass flow measuring systems.

In particular, the referenced patent describes a dual coil arrangement which is used in measuring the mass flow of a fluid over a wide temperature range with reduced attitude sensitivity. The patent specifies the use of open cell foam material to encase the sensing tube coils of the measuring system. The result alleged by the prior patent is a minimization of natural convection around the sensor coils and, thereby, the reduction in attitude sensitivity from greater than 50% without the insulator, to less than 0.5% with the insulator. However, the "open cell foam" or an "open cell beaded foam" material has several distinct disadvantages in operation such as uneven temperature control, thermal degradation and the like. Consequently, an improved thermal control arrangement is highly desirable relative to the sensing tube portion of the measuring system.

PRIOR ART

The most pertinent prior art known to Applicant is the previously cited U.S. Pat. No. 3,938,384. However, this reference does not show or suggest the thermal control apparatus of the instant invention.

SUMMARY OF THE INVENTION

This invention is directed to an improved mass flow measuring system for measuring the flow rate of a fluid in a tube and doing so over wide ranges of attitude and temperature. The improvement comprises encasing the sensor elements in a blanket of thermally insulating material which is arranged to effectively reduce the thermal air flow along the outer surface of the sensor. This device provides a plurality of paths substantially perpendicular to the sensor and arranged so that heat is conducted away from the sensor devices in or along these paths. Several types of materials are disclosed for use in the insulating device.

BRIEF DESCRIPTION OF THE DRAWINGS

FIG. 4 is an end view of the sensor apparatus shown in FIG. 3.

FIG. 5 is a cross-sectional view of the sensor apparatus in a constant temperature device.

FIG. 6 is a graphical representation of the temperatures in the system.

DESCRIPTION OF A PREFERRED EMBODIMENT

Figure 1:
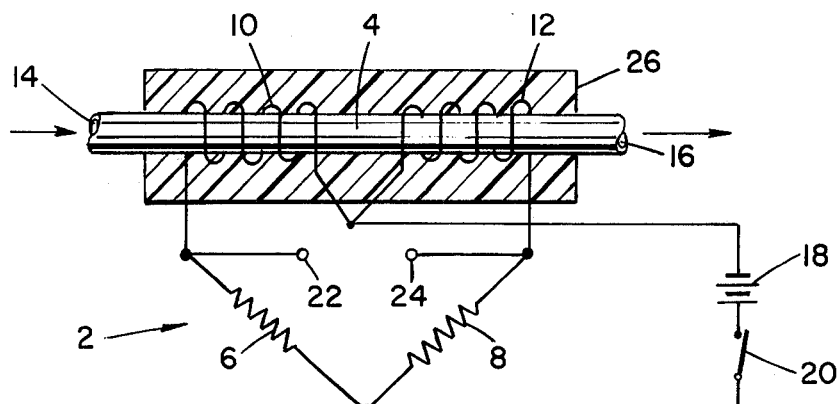
FIG. 1 is a schematic representation of the sensor portion of a mass flow measuring system.

Referring now to FIG. 1, there is shown one embodiment of a conventional mass flow measurement system which incorporates the principles of the instant invention. The system comprises a bridge circuit 2 which is coupled to a sensing tube 4. The bridge circuit is of conventional design and is formed of first and second bridge resistors 6 and 8, respectively. The bridge circuit further includes upstream sensor element 10 and downstream element 12. The sensor elements 10 and 12 are wound around the sensing tube adjacent each other with the upstream sensor element 10 closer to the input end 14 of the tube 4 and the downstream sensor element 12 closer to the output end 16 of tube 4. The bridge circuit 2 comprises a power supply 18 (typically a battery) which has one side thereof connected to the junction of the sensor elements 10 and 12. The other side of the power supply is connected through a switch 20 to the junction of the bridge resistors 6 and 8. Output signals from the bridge circuit are detected at first and second output terminals 22 and 24. The first output terminal 22 is connected to the junction of sensor element 10 and bridge resistor 6. The second output terminal is connected to the junction of sensor element 12 and bridge resistor 8. The sensor elements 10 and 12 are, typically, formed of temperature sensitive resistance wire which is wound around the tube 4. Such wire can be of an iron nickel alloy of conventional type. Typically, tube 4 is a thin walled, metal member, for example, of stainless steel or the like. Of course, other suitable materials can be used for the sensors or the tube.

In accordance with the instant invention (and the prior art) a suitable material 26 is form-fitted to tube 4 to encase sensor elements 10 and 12. This material must have low thermal mass so as to minimize its effect on the response time of the sensor and, as well, must have low thermal conductivity to avoid an inordinate reduction in sensor gain due to heat loss through the insulating material. On the other hand, the material cannot be fully insulative inasmuch as heat would then tend to be conducted along the sensor tube to produce inaccuracies which it is desirable to avoid. Thus, the material 26 cannot act as a heat sink nor can it totally insulate the sensors as will be discussed infra.

In operation, when switch 20 is closed, current passes through sensor elements 10 and 12 thereby raising the temperature of the tube 4 adjacent to the sensors. Heating of the sensors also increases the respective resistances thereof. At zero fluid flow through tube 4, the temperatures of the sensor elements 10 and 12 are equal whereby the bridge is balanced and produces zero output voltage between terminals 22 and 24.

However, as fluid enters the input end of tube 4, heat generated by elements 10 and 12 is carred downstream by the fluid toward the output end 16 of the tube. Thus, a temperature differential is created between the elements 10 and 12 due to the temperature profile or gradient along tube 14 (see FIG. 6). As the flow of fluid increases in the tube, the temperature of the upstream element 10 (as well as the resistance thereof) descrease while simultaneously the temperature of the downstream element (as well as the resistance thereof) increases in relation to the upstream element. That is, the lower temperature fluid absorbs more heat from the upstream sensor (thereby effectively cooling the upstream sensor) than does the now heated fluid absorb from the downstream sensor. As the resistances of the sensors change, voltage between terminals 22 and 24, increases in nearly linear proportion to the flow rate. This operation is typical and is described in the Blair patent noted above.

However, the prior art indicates that an insulator material 26 should be wrapped around and thereby encase the sensor elements. The prior art teaches that the insulator material 26 is preferably a foam insulation of the so-called "open cell" or the "open cell beaded" type. The prior art specifically teaches that the material can be polystyrene, foamed polyurethane, foamed polyethylene, or foamed polypropylene.

Figure 2:
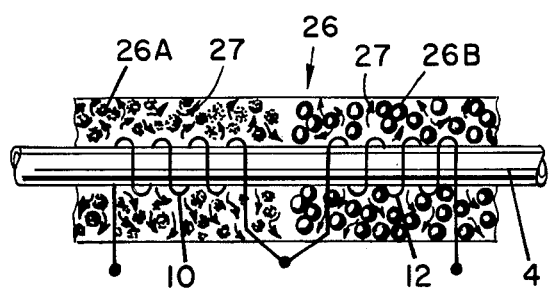
FIG. 2 is a schematic representation of a system known in the prior art.

Referring now to FIG. 2, there is shown a schematic representation of the device when fabricated in accordance with the teachings of the prior art. As shown in FIG. 2, elements which are similar to those shown in FIG. 1 bear similar reference numerals. Thus, tube 4 has sensor element coils 10 and 12 wound thereon. The foam material 26 is also shown in two different configurations or constructions. For example, material 26A depicts the so-called "open cell" foam structure while the material 26B shows the so-called "open cell beaded" foam structure. Basically, as can be seen, the open cell material 26A comprises a plurality of holes or openings, typically spherical in configuration, which are joined together by a webbing of material. In actuality, of course, the material is formed to have a plurality of spherical openings therein.

Conversely, the open cell beaded material 26B is of the opposite configuration. That is, the beaded material comprises a plurality of spherical elements or beads which are joined together but, because of being substantially spherical, have spaces or interstices therebetween. Thus, each of the materials 26A and 26B does, in fact, have certain open portions. Typically, an open cell foam has 50% or more of its volume formed by the open cells while the beaded material has less than 50% of its volume defined by the open portions.

In either event, it is clear that the thermal conductivity of the material is quite suspect and can lead to significant problems in areas of great sensitivity such as are defined and/or required in the instant type of device. For example, material 26A may tend to conduct heat away from the sensor elements and tube 4 through the openings therein. However, inasmuch as the openings are spherical in nature, the thermal conductivity is permitted in virtually any direction and multiple paths can be achieved wherein heat conduction can be returned to the original point. Typical paths are suggested by the arrows 27. While it is true that much of the heat is, in fact, conducted away from the sensing element portions of the device, it is clear that many paths are provided for heat to be returned to the apparatus. The heat which is returned causes the precision and accuracy of the device to be reduced for exactly the reason which is attempted to be avoided. Also, this type of material exhibits significant changes in structure and thermal insulation as a function of temperature and time. Consequently, this material is highly impractical in most applications.

Figure 3:
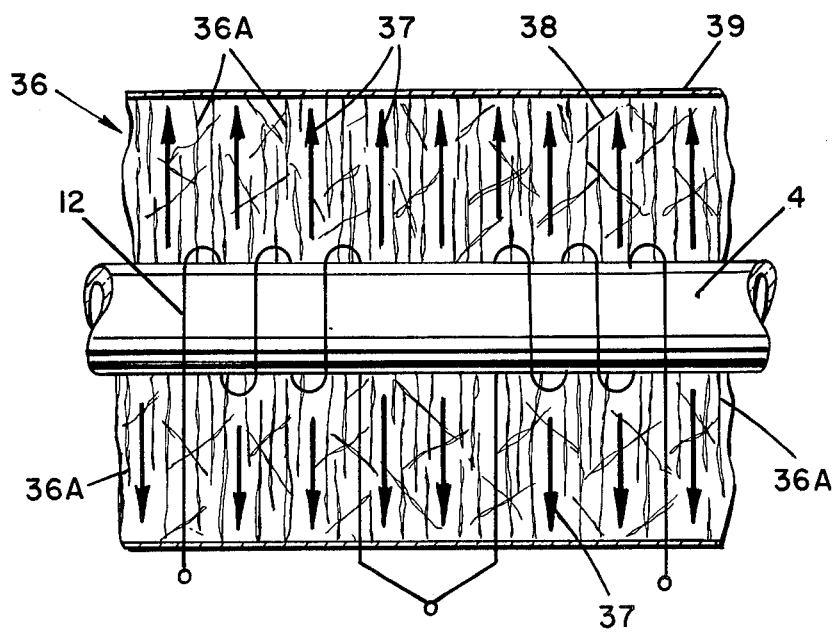
FIG. 3 is a schematic representation of the improved device of the instant invention.

Referring now to FIGS. 3 and 4 concurrently, there is shown the improvement of the instant invention. Again, elements which are similar to those previously described bear similar reference numerals. That is, tube 4 has sensor elements or coils 10 and 12 wound thereon. However, in the embodiment shown in FIGS. 3 and 4, the "insulator material" is represented by a batting or a mat 36 which, typically, is formed of a fibrous type of material. In particular, the structure of the fibrous material is such that a multiplicity of fibers is arranged substantially perpendicular to the axis of the tube. The perpendicular fibers 36A specifically impede flow of thermal air currents along the axis of the tube without significantly influencing the flow of thermal air currents perpendicular (radial) to the axis of the tube. This prevents convection currents from carrying heat along the tube and producing the undesirable effect of heat which is generated by the upstream sensor being sensed by the downstream sensor.

The blanket material 36 ideally is capable of withstanding the high temperatures which can be generated by the sensing elements. In the prior art, the foam material such as polystyrene or the like is not fully suitable for use in this environment. Therefore, by using the material described hereinafter, a major improvement is obtained in the temperature range of the encasement material 36 which, of course, renders the invention useful over a greater number of applications. Moreover, inasmuch as the substantially prependicular fibers 36A provide multiple paths for laminar radial flow of heat, represented by arrows 37, the heat is, for the most part, conducted away from the tube in such a manner that it is not returned or fed back to the tube to cause the problems which can occur in the foam material of the prior art.

Of course, in order to form a batt or blanket type of material 36 there must be certain interwoven fibers such as horizontal fibers 39, diagonal fibers 38 or the like. In point of fact, many of the interwoven fibers can be of a nearly random selection. However, the blanket will have the effect of providing the main laminar radial paths for the heat conduction.

It has been found that suitable fibrous types of batts or blankets can be formed of many types of materials. For example, the blanket can be formed, (e.g., wadded, woven, or the like) of a fibrous material such as kapok, polyester, fiberglass, asbestos, nylon, rayon, wool, fluoroplastic, polypropylene, polyolefin, aramid, polymeric, polycarbonate, polyethylene and ethylene copolymers, polysulfone, polyethersulfone, polyvinyl chloride and many other natural and man-made materials which can be arranged in a fibrous batt or blanket.

Referring now to FIG. 5, there is shown a preferred embodiment of the invention wherein insulator 36 is maintained in place around tube 4 by isothermal layer 50. Layer 50 may take the form of a metal enclosure or "can" which surrounds the sensor elements. Layer 50 has the advantage of providing a constant temperature plane around the sensor. Also, the insulator 36 is firmly positioned relative to the sensor. Thus, the thermal characteristics of the sensor are accurately definable and controlled. That is, any thermal "reflection" from layer 50 is based upon a constant temperature level for the entire sensor—not on a variable ambient temperature reflection. While it is contemplated that can 50 is at ambient temperature, any suitable temperature controlling or regulating means, such as heating or cooling can be used therewith.

Referring now to FIG. 6, there are shown graphs depicting the temperature of the can 50 and the sensor element 10. FIG. 6 is related to FIG. 5 to show the relative temperature vs. distance characteristic. As seen in FIG. 6, graph 60 represents the substantially constant temperature of the layer 50 relative to distance along the sensor. Conversely, graph 61 represents the temperature of the sensor along the length thereof. These graphs do not represent absolute temperatures. However, graph 60 is typically at or about ambient temperature which is on the order of 23° C. On the other hand, graph 61 can reach a high temperature on the order of 150° C. especially in the region where the sensing is performed. This latter temperature also has an impact upon the insulating material 36 which can be used. For example, open cell polystyrene begins to deform at about 300° F. and is, therefore, not a desirable material for this application.

As is seen in FIG. 6, the temperature of can 50 (graph 60), is at or about ambient as is the temperature of the sensor initially. As the sensor is heated in order to apply heat to the incoming fluid, the sensor temperature rises rapidly and falls more gradually inasmuch as the heated fluid moves along tube 4. The fibrous insulator 36 provides thermal paths from the sensor to the can—but not along the axis of tube 4. The radial thermal paths from tube 4 to constant temperature can 50 permit heat loss to a constant temperature source (sink) wherein an equilibrium condition is reached at the tube 4. This condition is a function of the heat generated by the sensor and the heat loss through insulator 36 to can 50.

Thus, there is shown and described an improved mass flow measuring system. The basic sensing elements are of a conventional type. However, the sensing elements are encased in a fibrous material which is thermally insulative and high temperature resistant. The fibrous material can be arranged as a woven batt or blanket, or can be otherwise arranged so that it provides a substantial portion thereof in the form of fibers which are substantially perpendicular to the axis of the sensor tube and of sufficient length to conduct heat from the tube so that the heat is not fed back to other portions of the tube. This type of arrangement is highly advantageous and much more desirable than the foam material of the prior art for the reasons noted above. Also, a constant temperature enclosure can be provided to more accurately control the temperature characteristics of the sensor system.

A number of materials which are suitable for use in the fibrous blanket encasement are noted above. Any other materials which fall within the purview of this description are intended to be included therein as well. The list of materials noted may be significantly enlarged by those skilled in the art. The materials listed are intened to be illustrative only and are not intended to be limitative. Rather, the scope of the invention is limited only by the claims appended hereto.

Having thus described a preferred embodiment of the instant invention, what is claimed is:

1. A mass flow measuring system for accurately measuring the flow rate of a fluid through a tube comprising,
   a plurality of self-heating sensing elements positioned along the flow path of said fluid,
   means for detecting a temperature differential between said sensing elements, and
   a fibrous material encasing said sensor elements wherein said fibrous material includes a substantial number of fibers arranged therein so as to be perpendicular to the axis of the sensing elements in order to conduct heat from said sensing elements in a laminar flow arrangement and to prevent heat flow from being returned to said sensing elements through said fibrous material.

2. The mass flow measuring system recited in claim 1 wherein,
   said fibrous material is in the form of a blanket or batt made from woven fibers.

3. The mass flow measuring system recited in claim 1 wherein,
   said fibrous material is formed of polyester batting.

4. The mass flow measuring system recited in claim 1 wherein,
   said fibrous material includes at least one of the group of materials comprising: fiberglass, wool, kapok, asbestos, nylon, rayon, fluoroplastic, polypropylene, polyolefin, aramid, polymeric, polycarbonate, polyethylene, ethylene co-polymers, polysulfone, polyethersulfone, polyvinylchloride.

5. The mass flow measuring system recited in claim 1 including,
   an isothermal layer disposed adjacent to said sensing elements such that said fibrous material is between said layer and said sensing elements.

6. The mass flowing measuring system recited in claim 5 wherein,
   said isothermal layer comprises a thermally conductive housing.

7. The mass flow measuring system recited in claim 6 wherein,
   said housing surrounds said sensing elements.

8. The mass flow measuring system recited in claim 6 wherein,
   said thermally conductive housing is formed of metal.

9. The mass flow measuring system recited in claim 1 wherein,
   said laminar flow is radially away from said sensing elements.

10. The mass flow measuring system recited in claim 1 wherein,
    said plurality of self-heating elements comprises at least two coils wound around said tube.

11. The mass flow measuring system recited in claim 10 wherein,
    said two coils are formed of a single coil which is center-tapped with the center-tap functioning as one end of each of two coils.

12. The mass flow measuring system recited in claim 2 wherein,
    said blanket or batt includes at least some fibers which are not substantially perpendicular to the axis of said sensing elements.

* * * * *